United States Patent [19]

Schmitz

[11] Patent Number: 5,158,041

[45] Date of Patent: Oct. 27, 1992

[54] ANIMAL HOLDING CRATE

[76] Inventor: Donald W. Schmitz, P.O. Box 196, Bonesteel, S. Dak. 57317

[21] Appl. No.: 813,886

[22] Filed: Dec. 23, 1991

[51] Int. Cl.⁵ .............................................. A01K 1/062
[52] U.S. Cl. .................................... 119/99; 119/147.1
[58] Field of Search ................ 119/904, 98, 99, 147.1

[56] References Cited

U.S. PATENT DOCUMENTS

| | | | |
|---|---|---|---|
| 2,999,480 | 9/1961 | Sparkman | 119/147.1 |
| 3,014,456 | 12/1961 | Shawk | 119/99 |
| 3,245,383 | 4/1966 | Priefert | 119/147.1 |
| 4,947,800 | 8/1990 | Widuey | 119/99 |

FOREIGN PATENT DOCUMENTS 214666  1/1958  Australia .............................. 119/99

Primary Examiner—John G. Weiss
Attorney, Agent, or Firm—Zarley, McKee, Thomte, Voorhees & Sease

[57] ABSTRACT

An animal holding crate including a pair of spaced end frames having side frames extending therebetween to define an animal holding area. Restraining members are movably mounted on each of the end frames to prevent the passage of an animal therethrough when in their closed position. When the restraining members are positioned in their open position, the animal is permitted free passage therethrough without any obstruction. The restraining members are preferably operated by means of a high power cylinder.

2 Claims, 2 Drawing Sheets

ANIMAL HOLDING CRATE

BACKGROUND OF THE INVENTION

Animal holding crates are used to restrain animals such as cattle or the like therein while the animals are being examined, treated, vaccinated, etc. Animal holding crates are well known in the art and normally comprise a pair of end frames which are spaced from one another and which are joined by side frame members. A gate is normally provided at each of the end frames to maintain the animal in the crate at times and for permitting the animal to pass therethrough when needed. Although the animal holding crates of the prior art have been generally satisfactory, it has been found that the gates, when in their open position, do not permit the animal to freely pass therethrough. It has also been found that the gates of the prior art devices are not easily operated.

It is therefore a principle object of the invention to provide an improved animal holding crate.

A further object of the invention is to provide an animal holding crate including a gate means at each of the opposite ends thereof which are operated by means of a power cylinder.

Still another object of the invention is to provide an animal holding crate wherein the animal restraining members at the opposite ends of the crate, when opened, permit the animal to freely pass therethrough.

These and other objects will be apparent to those skilled in the art.

SUMMARY OF THE INVENTION

Figure 1:
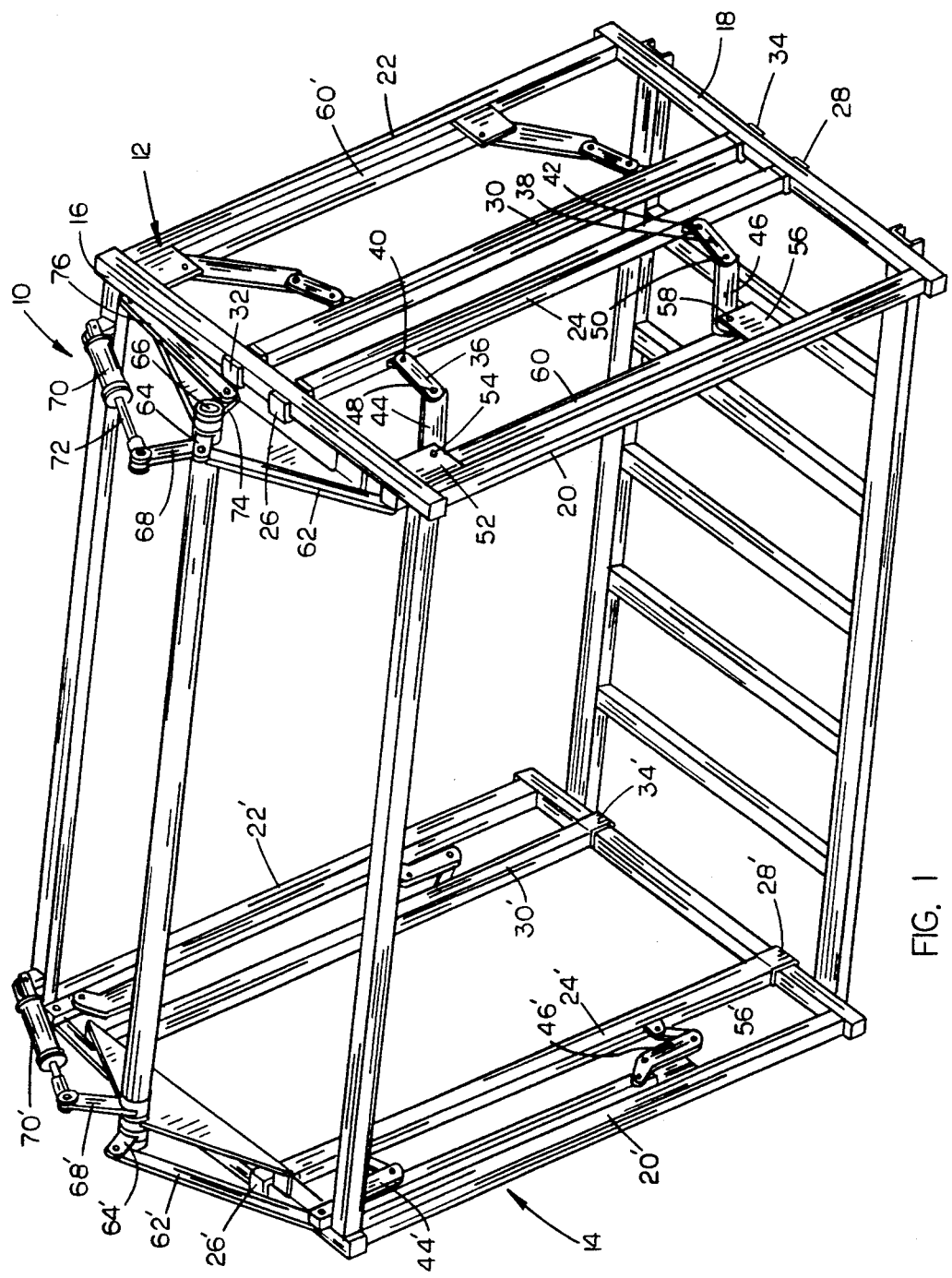
FIG. 1 is a perspective view of the animal holding crate of this invention.

An animal holding crate is described including a pair of spaced-apart end frames each of which have a pair of vertically disposed restraining members or gate members movably mounted thereon which may be moved from closed to open positions. The restraining members are moved from their open to closed positions by means of a power cylinder operatively connected thereto through a linkage. When the restraining members at one end of the crate are in their closed position, the restraining members are positioned closely adjacent one another to prevent the passage of an animal therebetween. When the restraining members at one end of the crate are positioned in their open position, an animal may freely pass therebetween.

DESCRIPTION OF THE PREFERRED EMBODIMENT

The animal holding crate of this invention is referred to generally by the reference numeral 10 and includes end frame means 12 positioned at one end of the crate and end frame means 14 positioned at the opposite end of the orate. The end frames 12 and 14 are joined by means of suitable side bracing to maintain the animal in the orate and to provide suitable strength to the crate. The specific side bracing is not a part of the invention and has been omitted in the drawings for purposes of clarity.

End frame 12 includes a top frame member 16, bottom frame member 18, and opposite side frame members 20 and 22. A vertically disposed restraining member 24 is movably mounted on end frame 12 and has a pair of -shaped brackets 26 and 28 provided on its upper and lower ends respectively which slidably embrace top frame member 16 and bottom frame member 18 respectively. The numeral 30 refers to a second restraining member movably mounted on end frame 12 and which has C-shaped brackets 32 and 34 at its upper and lower ends respectively which movably embrace top frame member 16 and bottom frame member 18 respectively.

Links 36 and 38 are pivotally connected to restraining member 24 at 40 and 42 respectively and are pivotally connected to links 44 and 46 respectively at 48 and 50 respectively.

Link 44 is pivotally connected to bracket 52 at 54. Link 46 is pivotally connected to bracket 56 at 58 as seen in FIG. 1. The outer ends of links 44 and 46 are pivotally connected together by means of link 60 extending therebetween. The upper end of link 60 is pivotally connected to link 62 and is operatively pivotally connected to ear 64. Ear 64 is secured to pipe 66 having ear 68 secured thereto and extending upwardly therefrom as seen in FIG. 1. Power cylinder 70 is operatively pivotally connected to ear 68 so that extension and retraction of the cylinder rod 72 will cause restraining member 24 to slidably move between its open and closed positions. Ear 74 is also secured to pipe 66 and has link 76 pivotally connected thereto. The outer end of link 76 is pivotally connected to the link 60' which is operatively connected to the restraining member 30 in the fashion identical to that described for restraining member 24 whereby retraction and extension of the cylinder rod 72 will cause the restraining member 3 to be moved between its open and closed positions.

Figure 3:
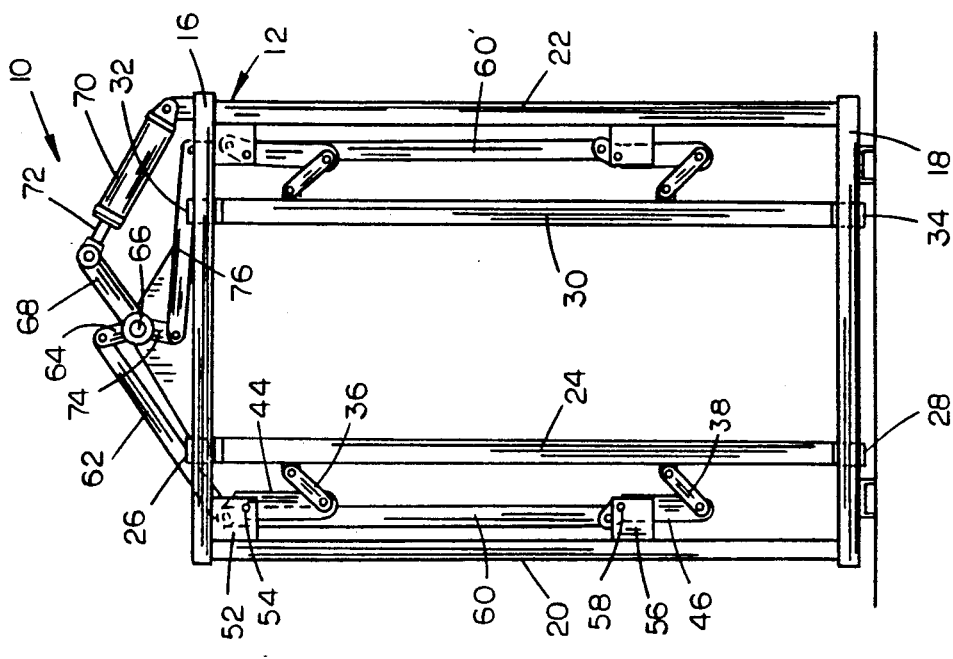
FIG. 3 is a view similar to FIG. 2 except that the restraining members have been moved to their open position.
Figure 2:
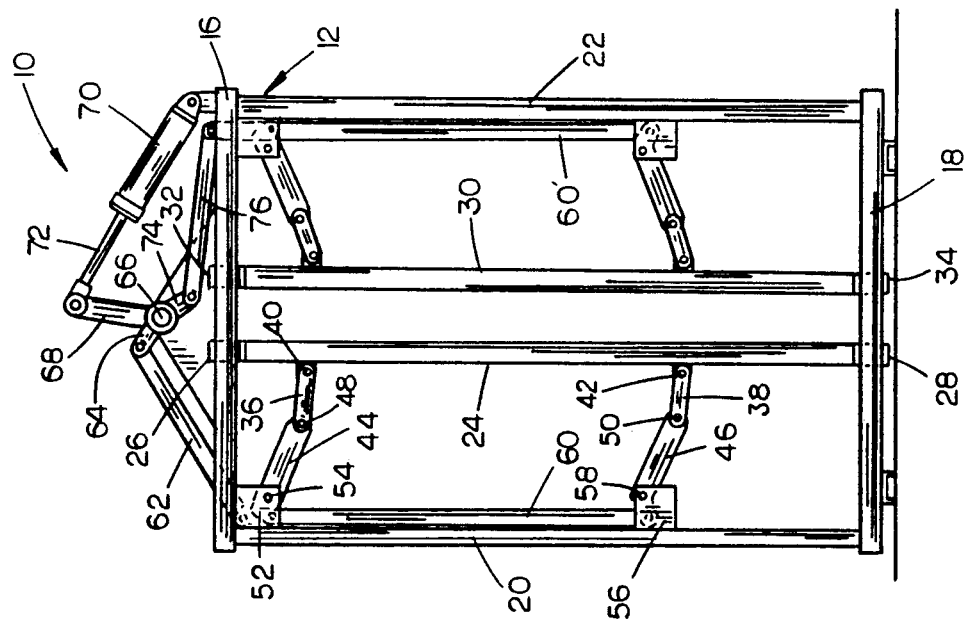
FIG. 2 is an end view of the animal holding crate of this invention with the restraining members at one end thereof in a closed position.

It can be seen that when the restraining members 24 and 30 are in the position of FIG. 2, the restraining members 24 and 30 will prevent the passage of an animal therebetween. When the restraining members 24 and 30 are in the open position of FIG. 3, the distance between the restraining members 24 and 30 is substantially equal to the distance between the frame members 20 and 22 so that an animal may pass freely therebetween.

In the preferred embodiment, the end frame 14 of the crate 10 has a pair of restraining members 24' and 30' movably mounted thereon which are moved to their open position when the restraining members 24 and 30 are moved to their closed position and which are moved to their closed position when the restraining members 24 and 30 are moved to their open position. Thus, in the position of FIG. 1, an animal may enter the crate between the restraining members 24' and 30' with the restraining members 24 and 30 preventing the animal from exiting the crate. When the animal has entered the crate, restraining members 24' and 30' will be closed behind the animal to prevent the animal from leaving the crate. When the animal has been treated or examined, restraining members 24 and 30 are opened to permit the animal to leave the crate. As soon as the animal has exited the crate, the restraining members 24 and 30 would again be closed. At that time, restraining members 24' and 30' would be opened to permit the next animal to enter the crate.

Thus it can be seen that a novel animal holding crate has been provided which is not only convenient to use but which includes restraining members which do not create an obstruction to the passage of an animal therebetween when moved to their open position. Thus it can be seen that the animal holding crate of this invention accomplishes at least all of its stated objectives.

I claim:

1. An animal holding crate comprising, a first end frame means including a horizontally disposed top frame member having opposite ends, a horizontally disposed bottom frame member having opposite ends, a vertically disposed first side frame member secured to end and extending between one end of said top frame member and one end of said bottom frame member, a vertically disposed second frame member secured to and extending between the other ends of said top and bottom frame members, said frame members of said first end frame means defining an opening through which an animal may pass, a first vertically disposed restraining member having its upper end slidably mounted on said top frame member and having its lower end slidably mounted on said bottom frame member, said first restraining member being selectively slidable from a first position closely adjacent said first side frame member to a second position wherein said first restraining member is positioned towards the center of the length of said top and bottom frame members, a second vertically disposed restraining member having its upper end slidably mounted on said top frame member and having its lower end slidably mounted on said bottom frame member, said second restraining member being selectively slidable from a first position closely adjacent said second frame member to a second position closely adjacent the first restraining member, a first linkage means operatively connected to said first restraining member for moving said first restraining member between its said first and second positions, a second linkage means operatively connected to said second restraining member for moving said second restraining member between its said first and second positions, said first linkage means including first upper and lower linkages pivotally connected at a first end to said first restraining member, and pivotally connected adjacent a second end to said first side frame member, said first upper and lower linkages having an ear projecting from their second ends, a first rigid member pivotally connected between said first linkage ear, so as to simultaneously pivot said linkages to move said first restraining member between its open and closed positions, a second linkage means including second upper and lower linkages pivotally connected at a first end to said second restraining member, and pivotally connected adjacent a second end to said second side frame member, said second upper and lower linkages having an ear projecting from their second ends, a second rigid member pivotally connected between said second linkage ears, so as to simultaneously pivot said linkages to move said second restraining member between its open and closed positions, a pipe member rotatably secured to said top frame member and having first and second ears projecting generally diametrically therefrom for rotation therewith, a first arm pivotally connected between said first ear and said first rigid member, to move the first rigid member in response to rotation of the pipe member and thereby move the first restraining member between its open and closed positions, a second arm pivotally connected between said second ear and said second rigid member, to move the second rigid member in response to rotation of the pipe member and thereby move the second restraining member between its open and closed positions, power cylinder means operably secured to said pipe member to selectively rotate the pipe in one direction, to move the first and second restraining members to open position, and to selectively rotate the pipe in the opposite direction to move said restraining arms to the closed position, a second end frame means spaced from said first end frame means, frame members connecting said first and second end frame means to define an animal holding area, said second end frame means including means to permit an animal to pass therethrough and for preventing the passage of an animal therethrough.

2. The crate of claim 1 wherein restraining members are also movably mounted on said second end frame means and wherein a power cylinder is operatively connected thereto for moving the same.

* * * * *